Figure 1:
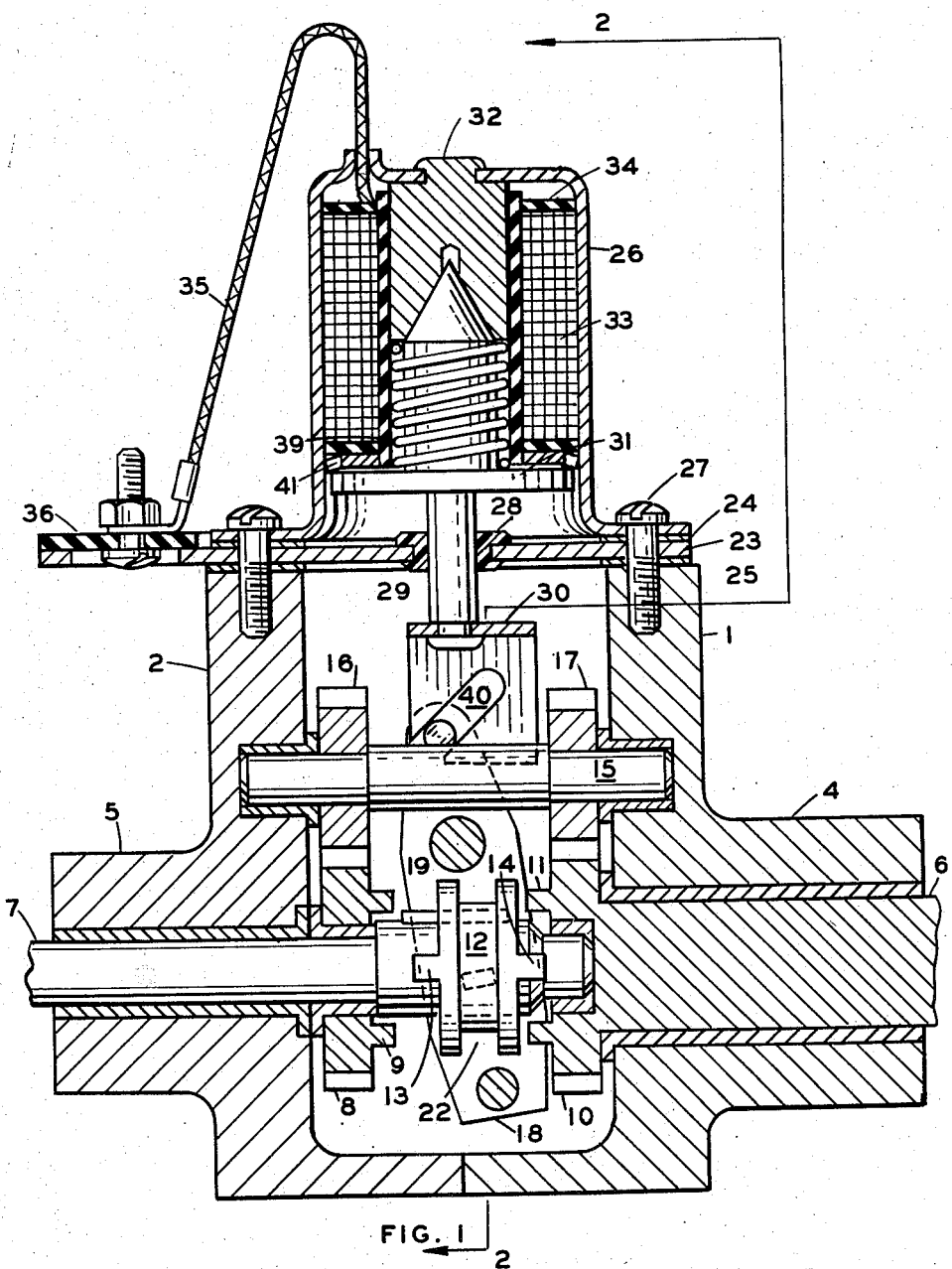

July 7, 1959 P. WARGO 2,893,256
ACTUATOR FOR A TWO-SPEED ADAPTER
Filed Sept. 12, 1955 2 Sheets-Sheet 1

INVENTOR
PETER WARGO

BY John C. Black
ATTORNEY

INVENTOR
PETER WARGO

BY John C Black
ATTORNEY

United States Patent Office 2,893,256
Patented July 7, 1959

2,893,256

ACTUATOR FOR A TWO-SPEED ADAPTER

Peter Wargo, Maywood, Ill., assignor to Stewart-Warner Corporation, Chicago, Ill., a corporation of Virginia Application September 12, 1955, Serial No. 533,641

2 Claims. (Cl. 74—370)

This invention relates in general to speed changing devices, and, more particularly to actuating means therefor.

The actuating means disclosed herein is provided for particular use with speed changing devices of the type shown in U.S. Patent No. 1,984,082 issued December 11, 1934, to Read, and of the type disclosed in applicant's copending application, Ser. No. 418,026, filed March 23, 1954, now Patent No. 2,797,588, (in which type devices a driven shaft is rotated at one speed when a clutch, keyed to a drive shaft, is shifted to one position to operatively engage the driven shaft and in which the driven shaft is rotated at different speed by two pair of spur gears when the clutch is shifted to a second position). This type of two-speed adapter (commonly used to drive speedometers of trucks having two gear ratios between the transmission and the vehicle propelling wheels) has in the past required the use of rather expensive shifting means which were subject to excessive wear—i.e., a prime mover was mounted outside of the adapter housing, a pivoted shifting mechanism was mounted in the housing and expensive, inefficient, troublesome linkages interconnected said prime mover and said shifting mechanism.

Due to the inherent structural space limitations in the housing of this type of adapter and due to the limited space in which the adapter can be mounted, no suitable internal shifting mechanism and linkage promoting the use of a prime mover integrally associated with the housing for the most efficient use of its power has previously been devised over a long period of commercial use. The applicant now proposes to provide a low cost, rugged, unusually efficient direct acting prime mover which is fast and reliable, has small space requirements and shows little or no tendency to wear or to require adjustment. Applicant's new arrangement also eliminates the necessity for close parts tolerances which were critical in previous arrangements.

Accordingly, a feature of this invention is the use of a direct-acting prime mover.

Another feature is the use of an improved prime mover.

Another feature of this invention is the use of an improved prime mover integrally disposed with respect to the housing.

Another feature of this invention is the use of a conventional rocker arm mechanism pivoted in the usual manner within an adapter housing in combination with an improved, direct-acting prime mover located within and integral with the housing.

A related feature is the use of the vertically extended upper portion of a substantially conventional adapter housing to receive and support various types of prime movers, for example, any one of a number of pressure or vacuum actuator means will known to the art as well as the electric solenoid shown in detail herein and to enclose a shifting fork operated by said prime mover.

Another feature is the use of a low cost, rugged, compact and very efficient solenoid as the prime mover for the actuator means.

Figure 2:
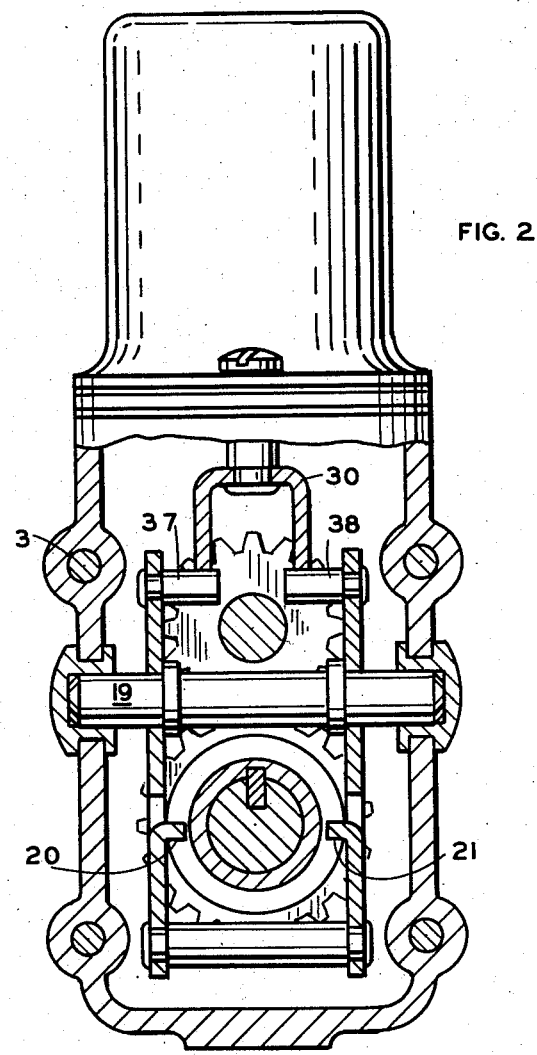
Figure 3:
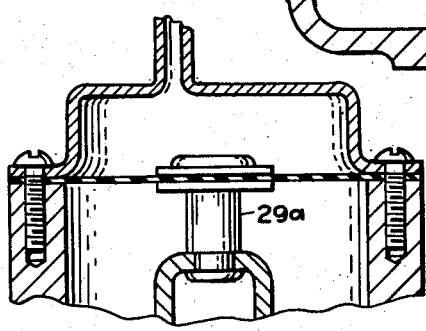

Additional features will be apparent upon a perusal of the following description in which Fig. 1 shows a sectional elevation view;

Fig. 2 shows an elevation view, partially in section, substantially along the line 2—2 and Fig. 3 shows diagrammatically a pressure or vacuum operated prime mover adapted for use in place of an electric solenoid.

In general, when the solenoid is energized, the shifting fork is raised to rotate a rocker arm to a position in which a clutch directly connects the drive shaft to the driven shaft. When the solenoid is de-energized, the shifting fork is forced downwardly to rotate the rocker arm to another position in which the clutch is shifted into engagement with a spur gear and the driven shaft is rotated at lower speed through a gear train.

The two-speed adapter shown herein is old in the art and will be described only briefly. Two vertical housing sections, 1 and 2 are secured together by means of screws 3; a driven shaft 6 and a drive shaft 7 are suitably journaled and axially aligned in bosses 4 and 5 provided at the lower portions of said housing sections, drive shaft 7 also being suitably journaled in driven shaft 6. A spur gear 8, having lugs 9 on the inner surface thereof, is rotably mounted on drive shaft 7. The driven shaft 6 has at its inner end a spur-gear-flange 10 with lugs 11 disposed on the inner surface thereof.

An annular clutch member 12 having lugs 13 and 14 disposed on either side thereof for engagement alternatively with the spur gear lugs 9 and 11, depending upon the position of said clutch 12, is slidably keyed to the drive shaft 7, intermediate the spur gears 8 and 10. A shaft 15 is suitably journaled in the housing of sections 1 and 2 with its axis parallel to the axis of shafts 6 and 7, intermediate spur gears 16 and 17 being rigidly secured to shaft 15 for rotation therewith. When the clutch member 12 is in the position shown, its lugs 14 engage lugs 11 of spur gear 10, whereby the driven shaft 6 is directly driven by, and at the same speed as, drive shaft 7. When the clutch member 12 is shifted to its other position, in which position its lugs 13 engage lugs 9 of spur gear 8, drive shaft 7 rotates clutch member 12, which in turn rotates spur gear 8, which rotates spur gear 16, which rotates shaft 15, which rotates spur gear 17, which rotates spur gear 10 to rotate the driven shaft 6 at a speed different from the speed of drive shaft 7.

A rocker arm 18 is pivoted on shaft 19 which is suitably journaled in housing sections 1 and 2. Said rocker arm 18 comprises two parallel plates disposed on either side of the clutch member 12, said plates having inwardly extending lugs 20 and 21 operatively engaging an annular groove 22 about the central portion of clutch member 12 for shifting said clutch member as the rocker arm is selectively rotated.

The actuating means will now be described in detail. A plate 23, with gaskets 24 and 25 disposed on either side thereof, provides an airtight seal for the upper portion of the housing sections 1 and 2, and serves as a support for an upper housing section 26, which for purposes herein will be called the solenoid casing. Said solenoid casing, plate and gaskets are suitably secured to the housing sections 1 and 2 by means of machine screws, such as screw 27. The central portions of plate 23 and gaskets 24 and 25 have bores therethrough for receiving and rigidly supporting an annular bushing 28, which has an axial bore for receiving a longitudinally shiftable cylindrical stem 29.

The lower end of said stem 29 has rigidly secured thereto a U-shaped fork 30. Said stem 29 has an enlarged upper portion terminating at the upper extremity in a conical tip. An annular disk 31 is press-fit on stem 29 abutting against the enlarged upper portion.

A generally cylindrical solenoid core 32 is rigidly secured to the top of said solenoid casing 26 so as to be axial therewith. A coil 33 wound on a spool 34 is disposed within casing 26 surrounding the core 32. An annular brass retaining disk 41 having a notched periphery is forced into casing 26 to retain coil 33 in the position shown in Fig. 1. One end of coil 33 is electrically connected to the casing 26 the other end of said coil being electrically connected to lead 35, which lead is secured to insulator 36 which is secured to plate 23 by rivets (not shown).

The U-shaped fork 30 is provided with inclined grooves 40 cut in the opposite vertical sides thereof, preferably at an angle of 45° with respect to the axis of stem 29, and each preferably disposed equally on either side of a plane perpendicular thereto and passing through the axis of stem 29. Said shifting fork 30 is disposed entirely within the housing sections 1 and 2 with pins 37 and 38 of rocker arm 18 disposed in operative engagement with the grooves 40.

The lower portion of the solenoid core 32 has a conical recess therein adapted to receive the upper conical tip of stem 29 which forms the solenoid plunger arm. It is preferable that the sides of the conical tip and recess form an angle of about 60° with the horizontal plane of Fig. 1, in order to develop the most power with the least number of turns in coil 33. Disk 31 provides a very efficient and economical means for obtaining a good magnetic circuit and provides stop means for the plunger arm so that a small air gap (for example .01″) exists between the plunger arm and the core 32. In this way, a stroke with substantial torque can be obtained with a relatively small coil.

A biasing compression spring 39 is provided about the upper enlarged portion of stem 29 in engagement with core 32 and disk 31 for the purpose of forcing stem 29 downwardly until disk 31 engages bearing 28 when coil 33 is de-energized. When coil 33 is energized its electromagnetic force pulls pin 29 upwardly against the force of spring 39 to the position shown in Fig. 1.

Attention is directed to the shifting fork 30 which is shifted up and down with stem 29 as coil 33 is energized or de-energized. The grooves in shifting fork 30 provide a wedge action with rocker arm pins 37 and 38, thereby to apply a maximum amount of force on pins 37 and 38 with a minimum amount of power from the solenoid.

The operation is as follows: with coil 33 energized, stem 29 is drawn to its uppermost position shown in Fig. 1 in very close proximity to core 32. The shifting fork 30 will be in its uppermost position, as shown, causing the rocker arm 18 to have assumed the position shown to force clutch 12 to the right with respect to Fig. 1 so that its lugs 14 engage lugs 11. Drive shaft 7 now rotates the driven shaft 6 directly.

When coil 33 is de-energized, the compression spring 39 forces stem 29 and shifting fork 30 to their lowermost position. Pins 37 and 38 are forced by the wedging action of the grooves 40 in fork 30 to rotate to the right with respect to Fig. 1, and lugs 20 and 21 of rocker arm 18 force the clutch 12 to the left with respect to Fig. 1 to a position in which lugs 13 engage the lugs 9 of spur-gear 8. The drive shaft 7 now rotates the driven shaft 6 at a different speed by way of gears 8, 16, 17 and 10.

Attention is directed to Fig. 3 which shows diagrammatically the use of a pressure or vacuum operated diaphragm to which is secured a stem 29A for shifting clutch 12 substantially in the same manner as the solenoid shown in Fig. 1 with little, if any, change in the housing sections 1 and 2 or in the shifting fork or rocker arm.

While there has been described what is believed at present to be the preferred embodiment of the invention, it will be understood that various modifications and changes therein may be made; and it is contemplated to cover in the appended claims all such changes and modifications as fall within the true spirit and scope of the invention.

What is claimed is:

1. A two-speed adapter of the type in which a drive shaft and a driven shaft are journaled coaxially in a housing; in which a clutch member is keyed to the drive shaft for rotation therewith but for relative axial movement thereon so that, in one position thereof, the clutch is disposed for operative engagement with the driven shaft to cause the drive shaft to directly rotate the driven shaft at one speed, and in another position thereof, the clutch is disposed to rotate the driven shaft at a different speed by means of two spaced pairs of spur gears; and in which a rotatably mounted rocker arm is disposed within the housing between the pairs of gears and straddling the clutch member to shift the clutch member to its one and other positions; in combination therewith, an actuating mechanism comprising a solenoid having a core mounted integrally with said housing with its axis lying on a line extending radially from the drive shaft and intersecting the axis of rotation of the rocker arm at a right angle, a solenoid plunger arm coaxial with the core and reciprocably mounted at least partially within the housing, a shifting fork rigidly secured to the end of the plunger arm within the housing, spaced inclined wedge surfaces on the fork, each surface disposed partially on either side of and defining an acute angle of approximately 45° with a plane which is perpendicular to the shaft axes and which intersects the rocker arm axis, the wedge surfaces connected to the rocker arm for causing the arm to shift the clutch member incident to reciprocable movement of the solenoid plunger arm and the fork, and biasing means urging the plunger away from the core.

2. A two-speed adapter in which a drive shaft and a driven shaft are journaled coaxially in first and second sections respectively of a main housing, in which a clutch member coaxial with said shafts is effective in one position thereof to cause the drive shaft to directly rotate the driven shaft at one speed and in another position thereof to cause the driven shaft to be rotated by the drive shaft at a different speed by means of two spaced pairs of spur gears disposed in planes adjacent opposite axial ends of said clutch member and in which a rocker arm rotatably mounted on an axis transverse to the axis of said clutch member is disposed in said housing between said pairs of gears straddling said clutch member for shifting said clutch member to said one and other positions, wherein said housing sections have an aperture therethrough radially adjacent to the rocker arm, in combination therewith a cup-like housing section secured to said main housing over said aperture, a solenoid coil and core disposed within said cup-like section, a reciprocable solenoid plunger arm extending through said aperture into said main housing substantially along a line extending radially from said clutch member and through the axis of said rocker arm, wedge means rigidly secured to the end of said plunger arm within said main housing generally between said pairs of gears and positioned for operatively engaging said rocker arm and biasing means for urging said plunger arm away from said solenoid core.

References Cited in the file of this patent

UNITED STATES PATENTS

| | | |
|---|---|---|
| 688,516 | Harris | Dec. 10, 1901 |
| 1,243,586 | Brown | Oct. 16, 1917 |
| 1,313,362 | Wiegand | Aug. 19, 1919 |
| 2,088,451 | Thomas | July 27, 1937 |
| 2,630,718 | Dickas | Mar. 10, 1953 |
| 2,767,598 | Burg | Oct. 23, 1956 |

FOREIGN PATENTS

| | | |
|---|---|---|
| 372,694 | Germany | Mar. 31, 1923 |
| 638,301 | Great Britain | June 7, 1950 |
| 806,095 | Germany | June 11, 1951 |